(12) United States Patent
Beaver

(10) Patent No.: US 6,336,672 B2
(45) Date of Patent: Jan. 8, 2002

(54) MODULAR RETAINER CLIP ASSEMBLY FOR USE IN AN AUTOMOBILE

(76) Inventor: Jeffrey L. Beaver, 2840 Corey Dr., Indianapolis, IN (US) 46227

( * ) Notice: Subject to any disclaimer, the term of this patent is extended or adjusted under 35 U.S.C. 154(b) by 0 days.

(21) Appl. No.: 09/797,132

(22) Filed: Mar. 1, 2001

Related U.S. Application Data

(62) Division of application No. 09/433,229, filed on Nov. 4, 1999, now Pat. No. 6,231,109.

(51) Int. Cl.[7] ................................................. B60J 3/00
(52) U.S. Cl. ................. 296/97.9; 296/214; 248/229.16; 248/231.81
(58) Field of Search ............... 296/97.9, 214; 248/229.16, 229.26, 231.81

(56) References Cited

U.S. PATENT DOCUMENTS

| | | | | |
|---|---|---|---|---|
| 5,062,608 A | | 11/1991 | Phelps et al. | 248/289.11 |
| 5,242,204 A | | 9/1993 | Kitterman et al. | 248/289.11 |
| 5,358,299 A | | 10/1994 | Seto | 296/97.9 |
| 5,403,064 A | | 4/1995 | Mahler et al. | 296/214 |
| 5,499,854 A | | 3/1996 | Crotty, III et al. | 296/97.13 |
| 5,507,545 A | | 4/1996 | Krysiak | 296/97.9 |
| 5,765,896 A | | 6/1998 | Grisval | 296/97.9 |
| 5,868,370 A | | 2/1999 | Nivet | 296/97.9 X |
| 5,918,927 A | | 7/1999 | Renahy et al. | 296/97.9 |
| 6,003,928 A | * | 12/1999 | Curtindale | 296/97.9 |
| 6,021,986 A | * | 2/2000 | Murdock | 248/289.11 |
| 6,068,323 A | * | 5/2000 | Brown et al. | 296/97.9 |
| 6,250,708 B1 | * | 6/2001 | Kurachi | 296/97.9 |

* cited by examiner

Primary Examiner—Joseph D. Pape
Assistant Examiner—Patricia Engle
(74) Attorney, Agent, or Firm—Rader, Fishman & Grauer, PLLC

(57) ABSTRACT

A retainer clip assembly for securing a sun visor interiorly in an automobile. The retainer clip assembly includes a movable lever attached thereto which secures the retainer clip assembly to a vehicle ceiling panel. The lever includes a release member which is accessible from the exterior of the retainer clip, so that the lever may be disengaged and the retainer clip removed. A transportation clip is disclosed for use with the retainer clip assembly. The transportation clip connects the retainer clip to a headliner module during transportation to the final point of assembly. At the final point of assembly, the retainer clip can be pushed into its installed position and the transportation clip is concealed within the retainer clip and need not be removed.

7 Claims, 18 Drawing Sheets

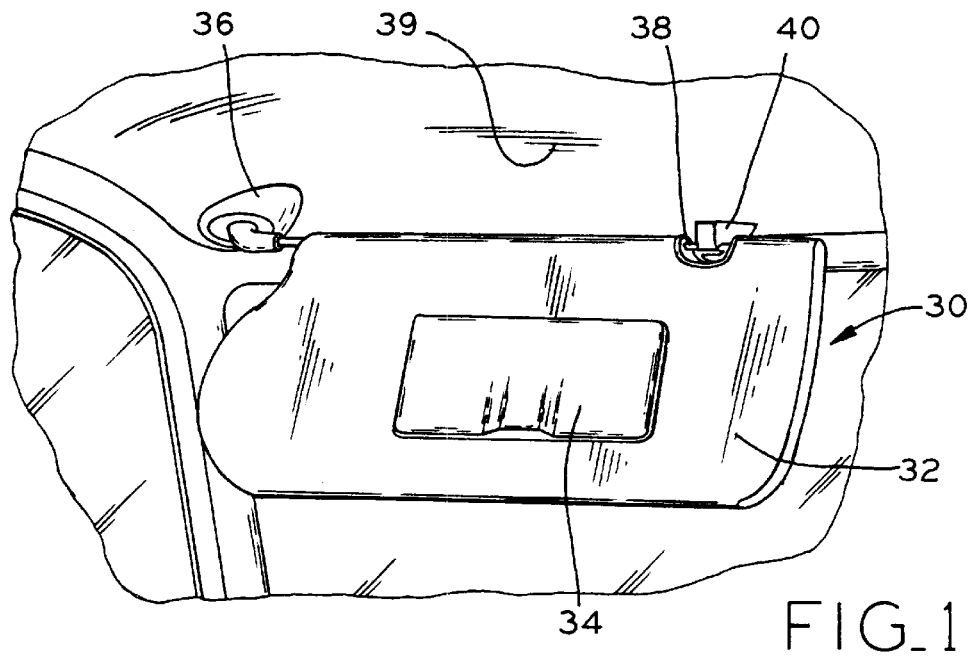
FIG_1
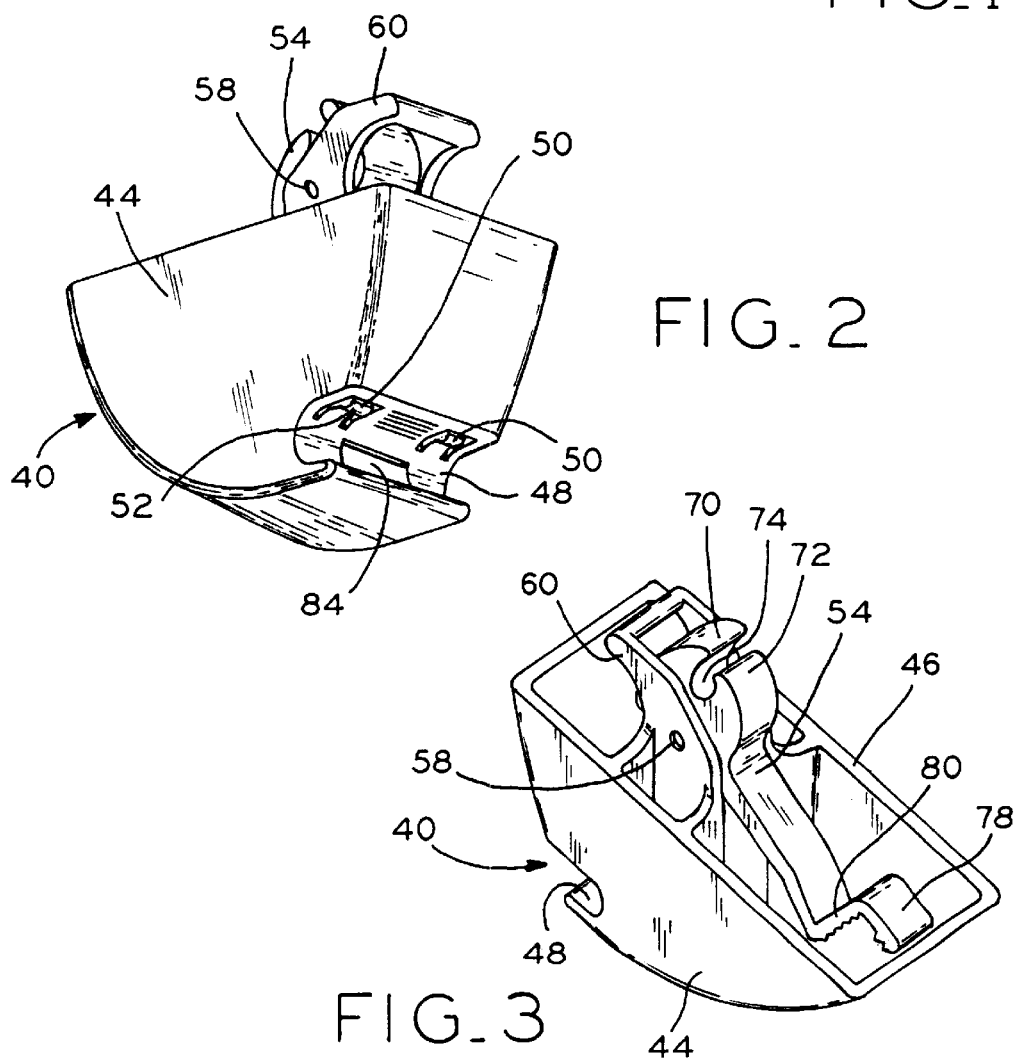
FIG_2
FIG_3

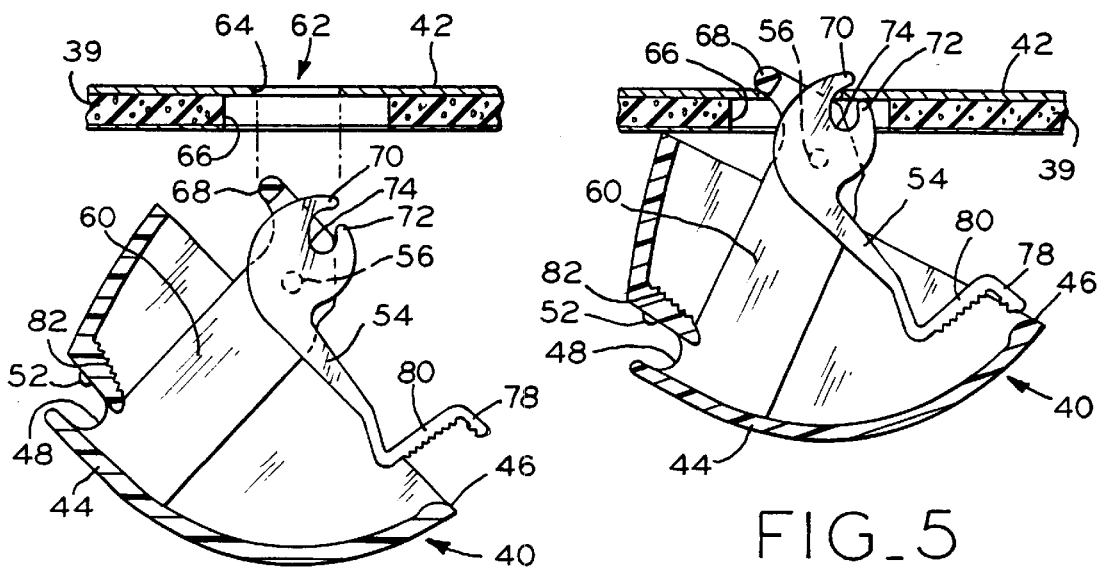
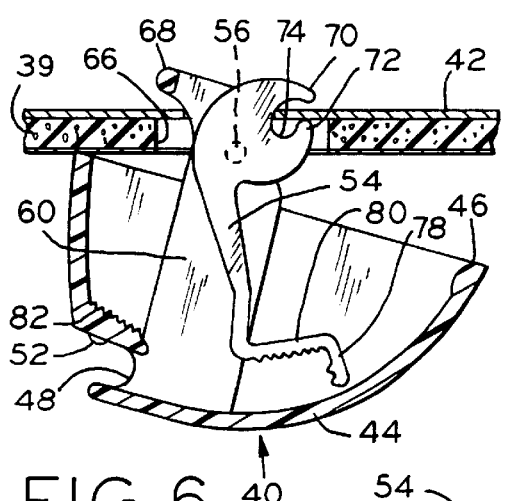
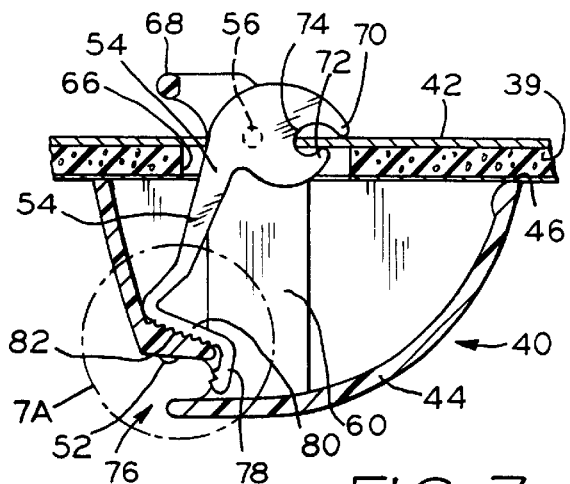
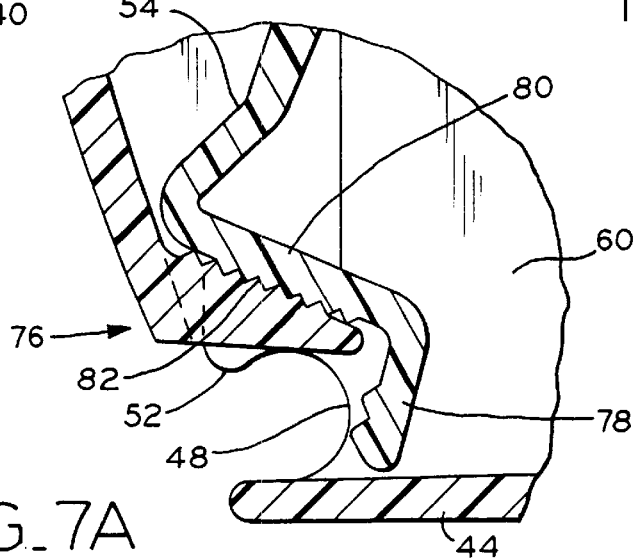

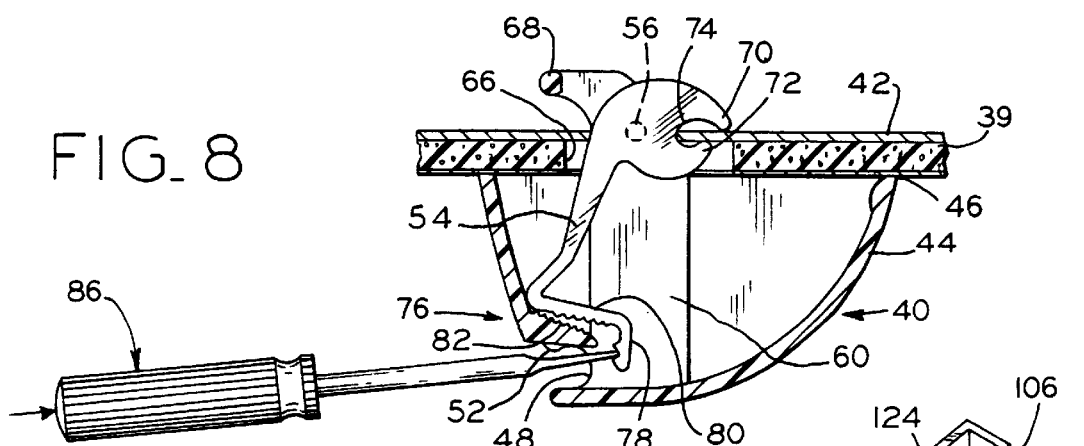
FIG_8
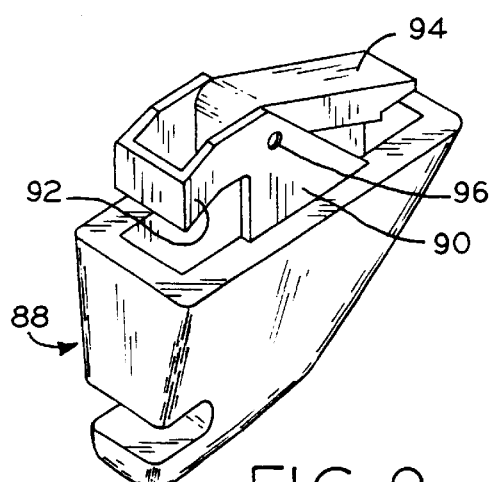
FIG_9
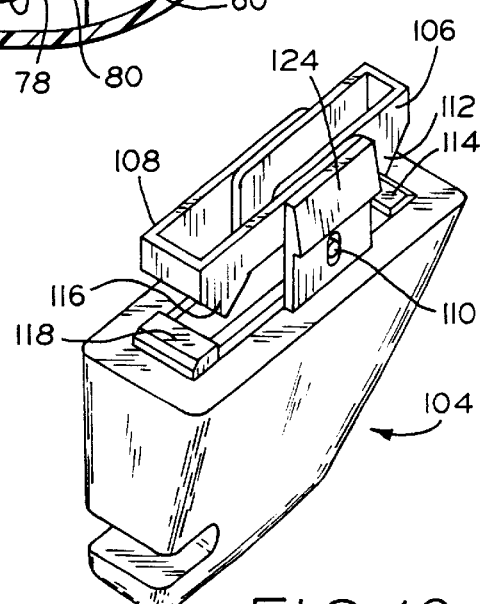
FIG_10
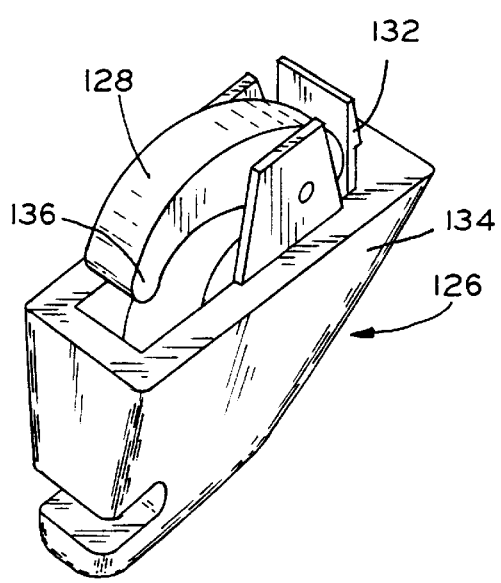
FIG_11
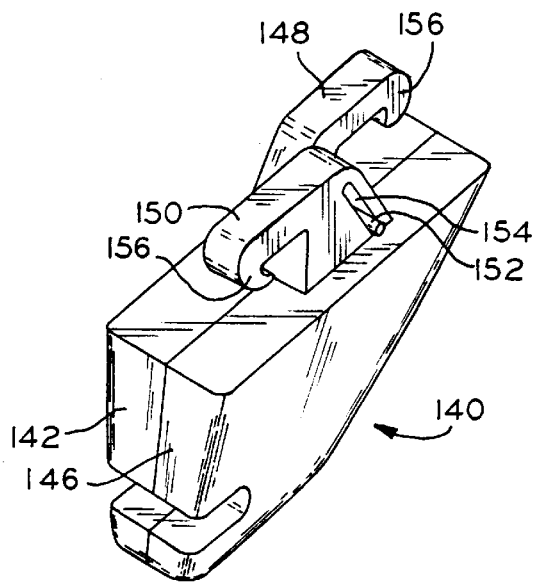
FIG_12

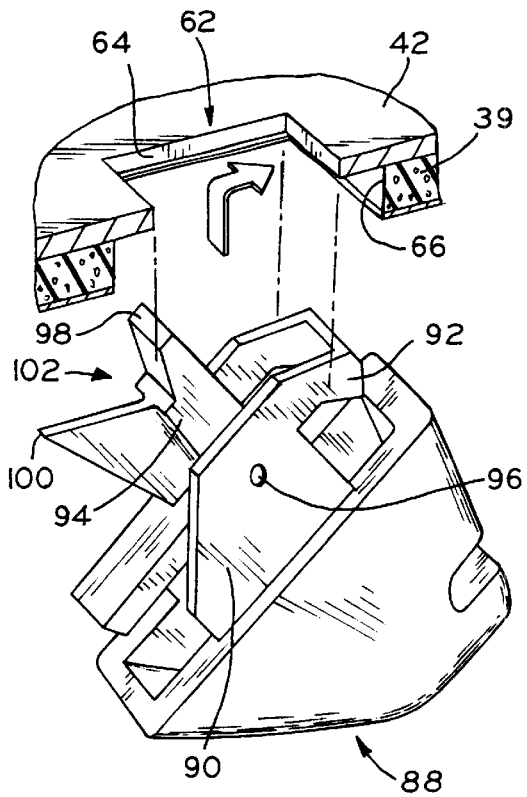
FIG_13
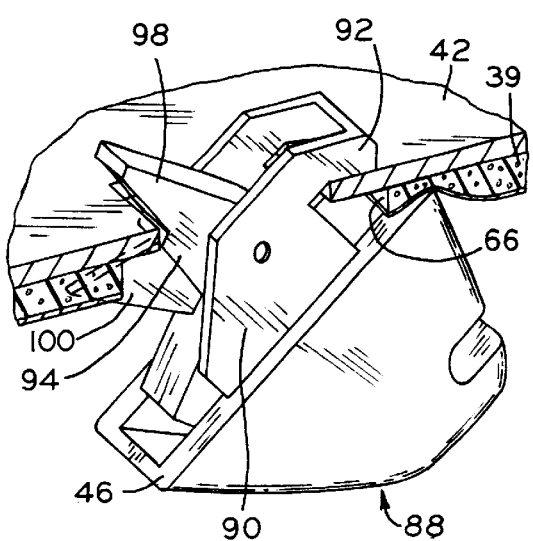
FIG_14
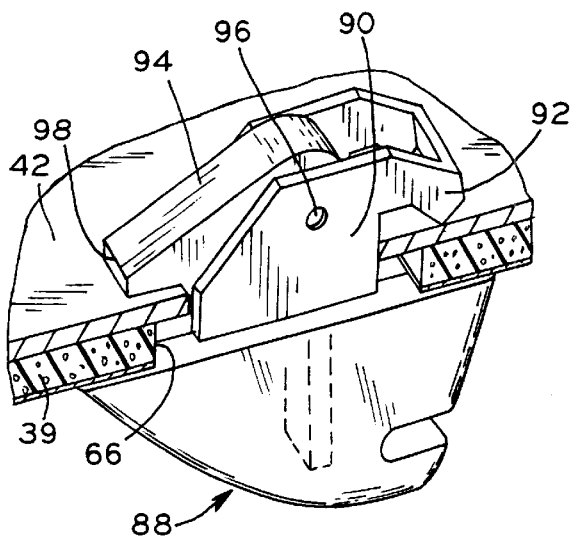
FIG_15
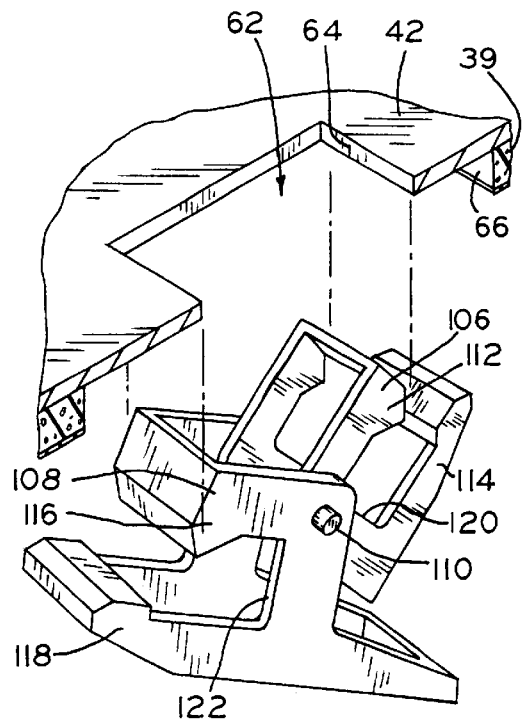
FIG_16

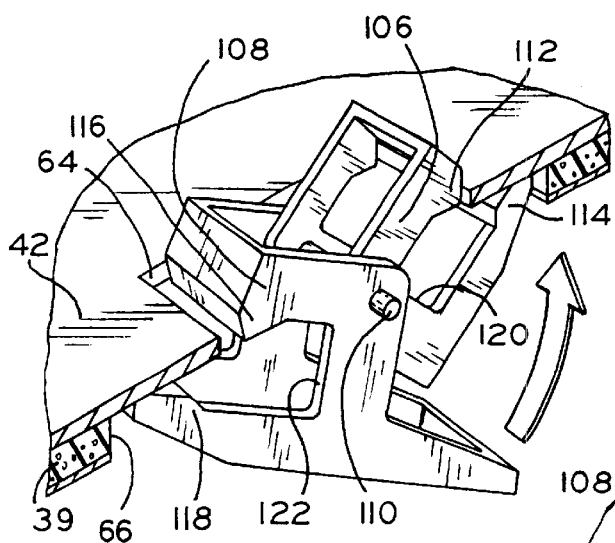
FIG_17
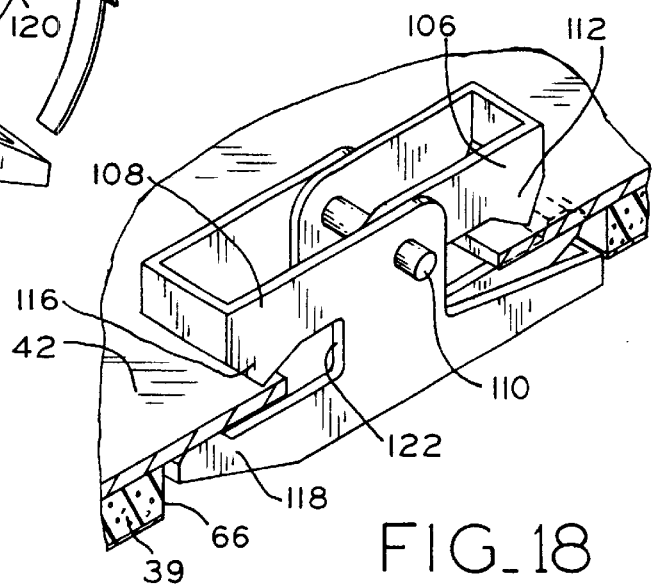
FIG_18
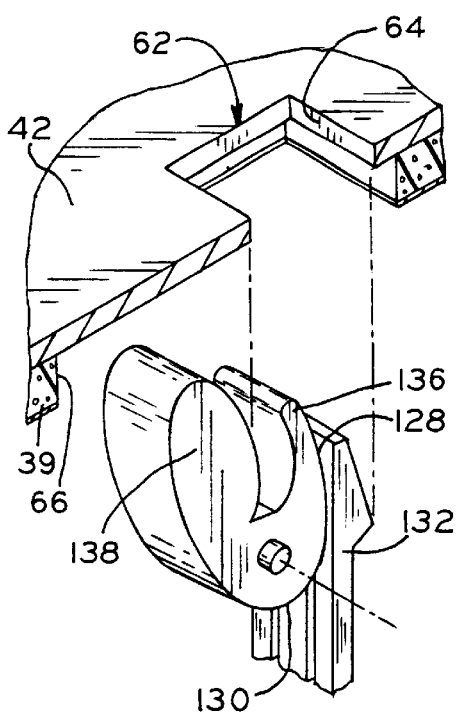
FIG_19
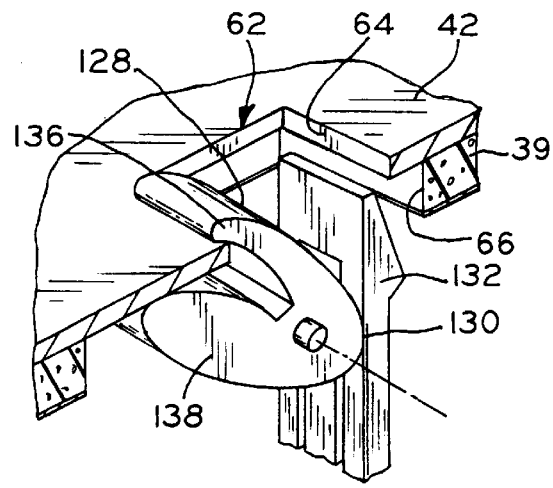
FIG_20

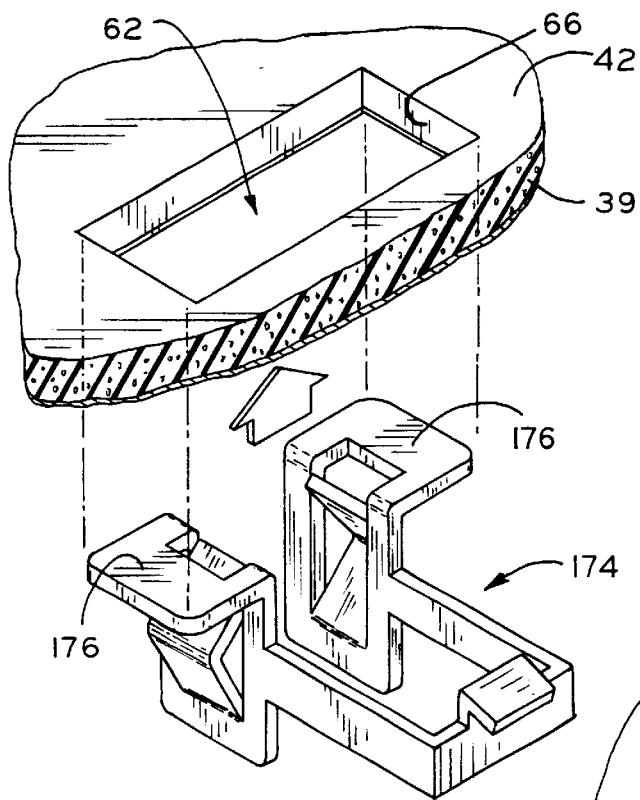
FIG_25
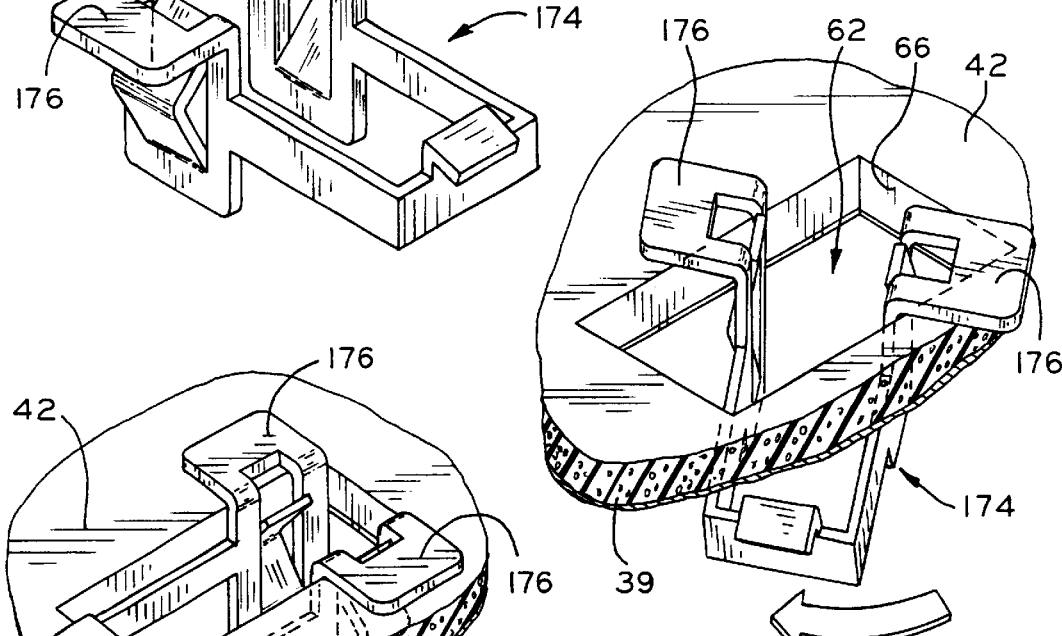
FIG_26
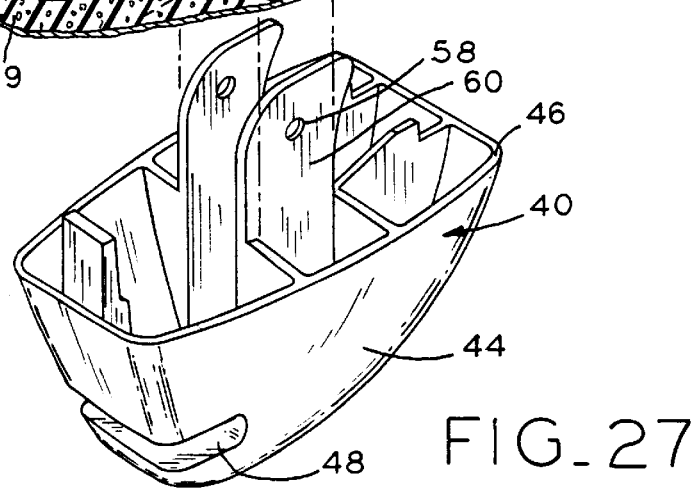
FIG_27

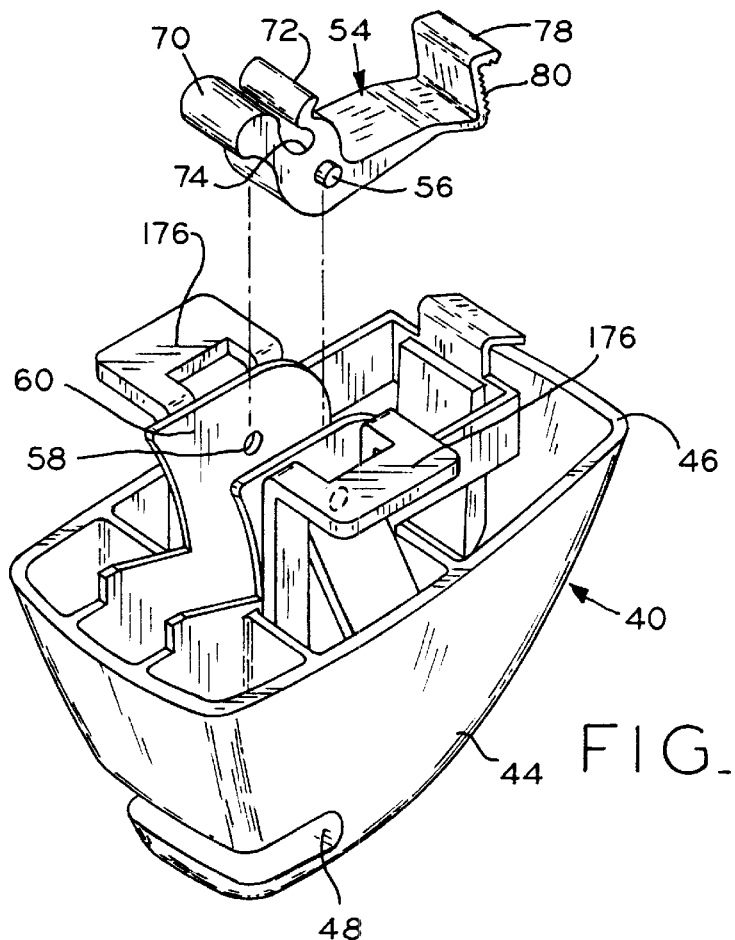
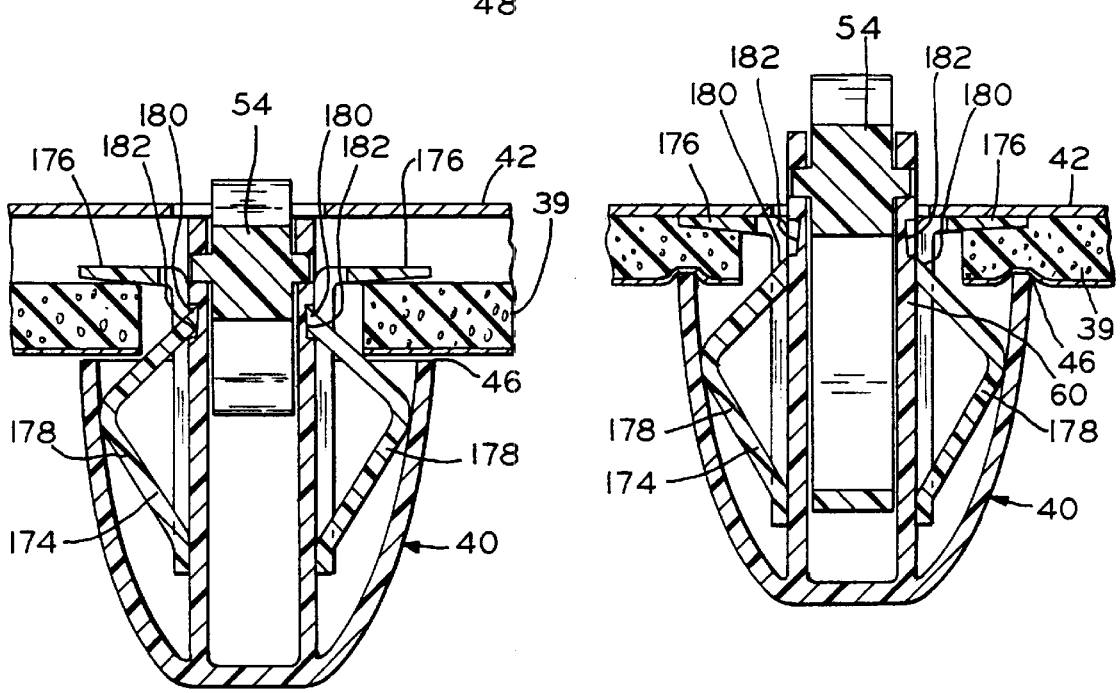
FIG. 28
FIG. 29
FIG. 30

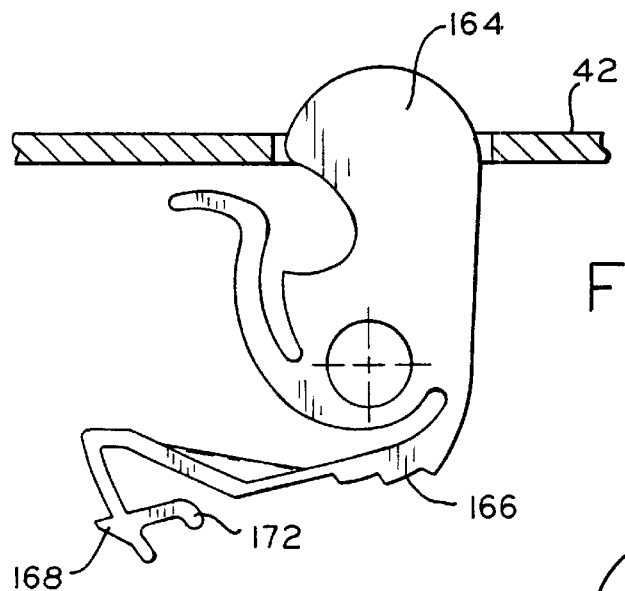
FIG. 31
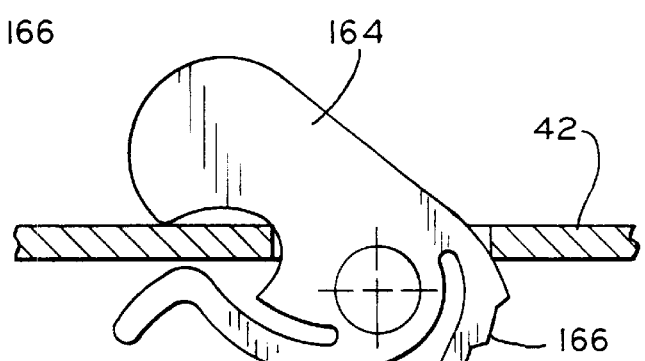
FIG. 32
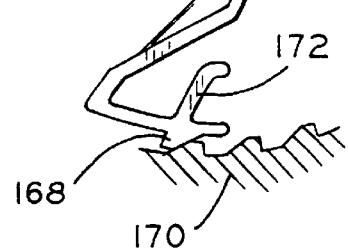

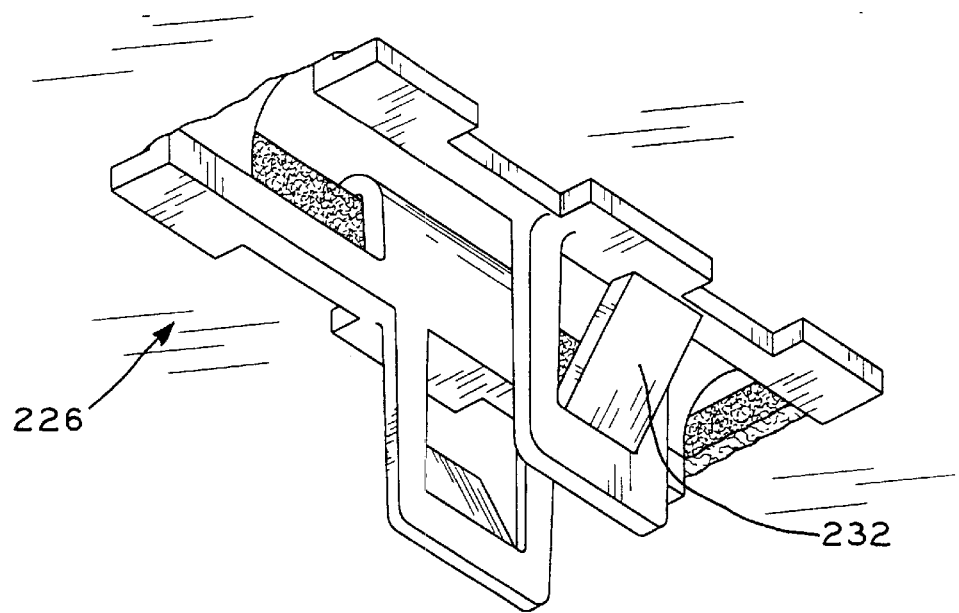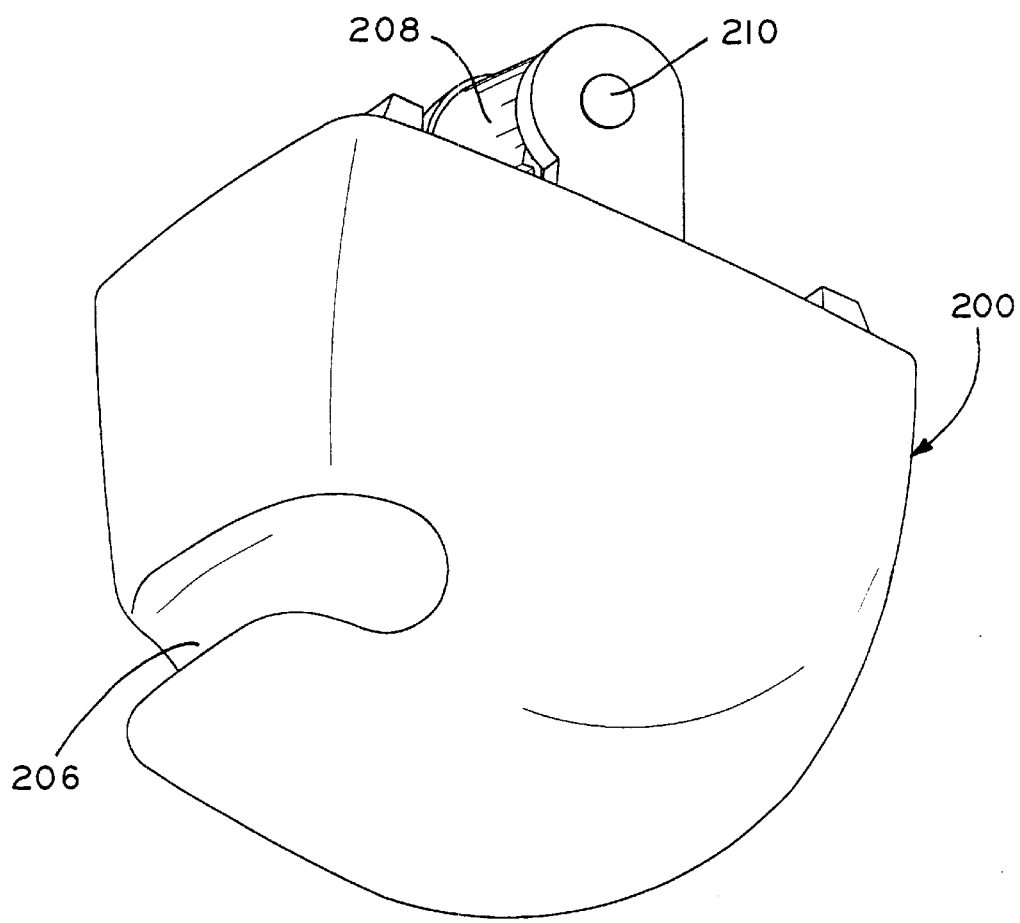
FIG_40

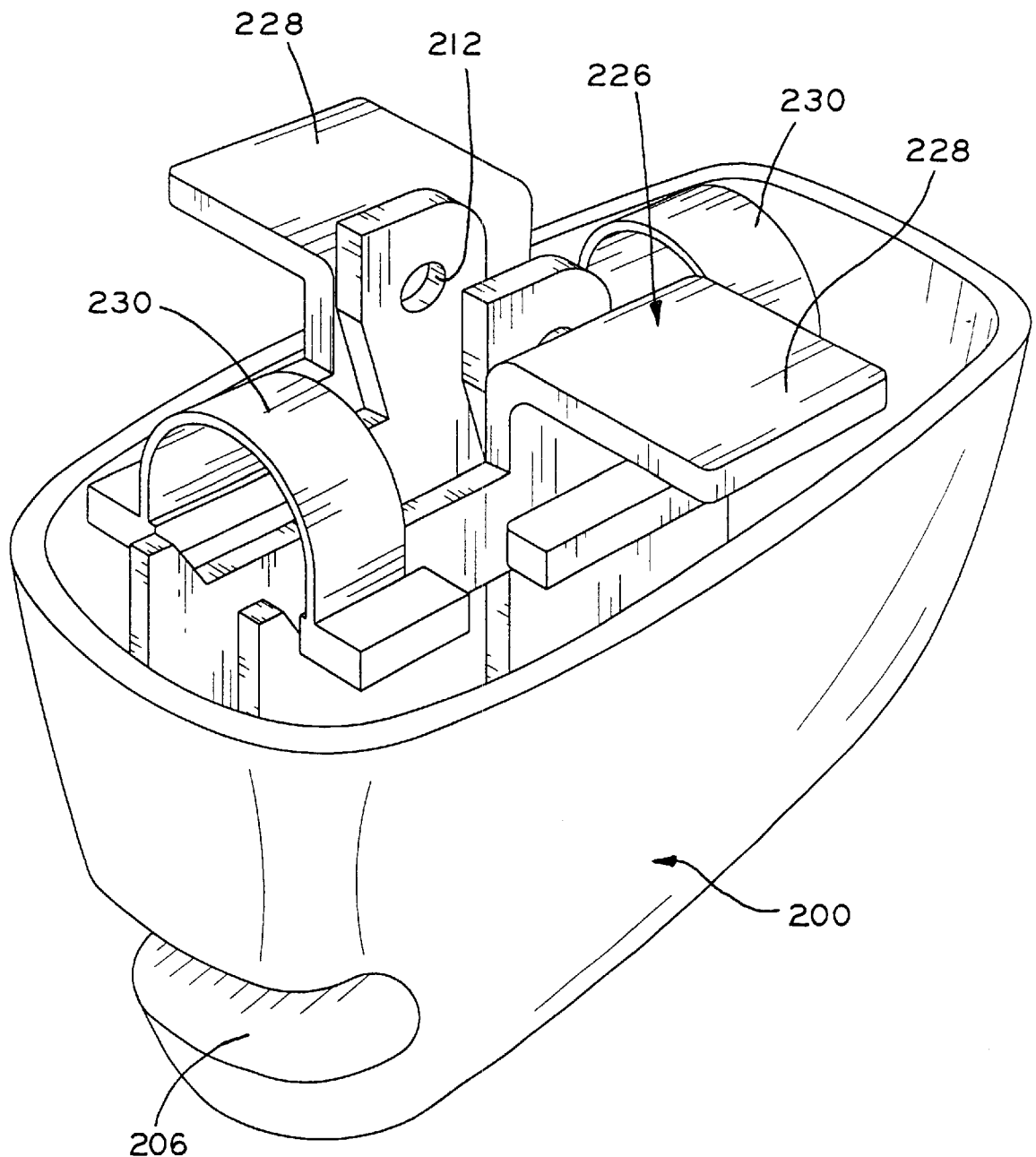
FIG_41

MODULAR RETAINER CLIP ASSEMBLY FOR USE IN AN AUTOMOBILE

This application is a divisional application of Ser. No. 09/433,229, filed Nov. 4, 1999 now U.S. Pat. No. 6,231,109.

BACKGROUND OF THE INVENTION

The present invention relates generally to automobile modules, and in particular, to a modular retainer clip assembly for use in an automobile module which will ultimately become part of an assembled automobile.

Sun visors for vehicles are typically mounted on the vehicle body roof by a bracket assembly that provides both a horizontal axis about which a visor blade pivots between a storage position adjacent the vehicle headliner and a use position adjacent the windshield, and a generally vertical axis about which the visor pivots between a forward windshield position and a side window position. The need to use fasteners and tools, either powered or hand driven, in the installation into vehicles of many existing sun visor mounting bracket assemblies and retainer clips is undesirable for a number of reasons. For example, in addition to diminishing the aesthetics of the finished product, fasteners may be more labor intensive to install and therefore expensive to employ. Fasteners may also be costly as well as potentially damaging to the vehicle.

A variety of sun visor mounting assemblies have been developed, such as those disclosed and described in U.S. Pat. Nos. 5,062.608, 5,242,204 and 5,499,854. U.S. Pat. No. 5,499,854 is owned by the assignee of the present invention, the disclosure of which is hereby incorporated by reference.

While the above-mentioned art was suitable for its intended purpose, new manufacturing methods are revolutionizing the way car makers produce automobiles. In particular, the automobile industry is moving toward "modular manufacturing," which is an efficient outsourcing scheme which promises to shave thousands of dollars from the cost of building each car. In brief, modular manufacturing is a scheme whereby individual suppliers supply the automobile manufacturer/assembler with one or more "modules." For example, a front end module may include the main frame carrier, the bumper beam, the engine cooling system and the lighting system. Other modules could include chassis, axles and suspension, tire/wheels, or engine/transmission.

It is desirable to provide a retainer clip assembly adapted to be easily transported as part of a module and easily installed by the end assembler of the automobile.

SUMMARY OF THE INVENTION

The present invention provides a retainer clip assembly which can be easily transported with a larger module and easily installed to the module as part of the final assembly of the automobile. The inventive retainer clip assembly utilizes a lever movably attached to the retainer clip body. The lever fits through an opening extending through the headliner and sealing panel of the module and secures the retainer clip thereto. The invention also provides a transportation clip which connects the retainer clip to the headliner during transportation of the module.

In one form thereof, the present invention provides a retainer clip for use in an automobile. The automobile includes a rigid panel having a headliner adjacent thereto. An opening extends through the panel and headliner for insertion of the retainer clip. The retainer clip includes a housing member forming a retainer clip body. The housing member defines an edge adapted to abut a side of the headliner, and further defines a notch. A lever is movably attached to the housing member, and the lever is movable between a first position wherein the lever is adapted for inserting into the opening and a second position wherein the lever abuts the rigid panel, thereby securing the retainer clip to the panel and headliner.

In a preferred form thereof, the edge of the housing member and the lever are adapted to sandwich the headliner and panel therebetween when the lever is positioned in the second position. The retainer clip further includes a locking mechanism to secure the lever in the second position. The locking mechanism includes a latch member disposed on the lever and a pawl member defined by the housing. The ratchet member engages the pawl member when the lever is positioned in the second position. A release member is included with the locking mechanism whereby the lever can be disengaged from the second position so that the retainer clip can be removed from the panel. Conveniently, the release member is accessible exteriorly of the retainer clip.

In another form thereof, the present invention provides a transportable automobile module. The module includes a rigid panel and a headliner disposed adjacent the panel. The panel and headliner define an opening therethrough. A retainer clip having a notch for releasably receiving a rod of a vehicle sun visor is provided. A transportation clip is disposed in the opening. The transportation clip engages the retainer clip in a pre-installation position comprising the retainer clip being connected to the module. As such, the module can be transported with the retainer clip positioned in the pre-installation position.

In a preferred form thereof, the retainer clip further comprises an installed position, the transportation clip being maintained with and concealed by the retainer clip in the installed position. As such, the transportation clip need not be removed to install the retainer clip.

In yet another form thereof, the present invention provides a module retainer clip assembly for use in an automobile. The automobile includes a rigid panel having a headliner adjacent thereto. An opening extends through the panel and headliner for attachment of the retainer clip. The retainer clip assembly comprises a retainer clip body further defining a notch for releasably receiving a rod of the sun visor. A lever is pivotally attached to the retainer clip body and further includes a projection at a distal end thereof. The projection extends exteriorly of the body. The lever is movable between a first position wherein the projection is adapted to be inserted into the opening and a second position wherein the projection is adapted to extend into the opening and abut against the rigid panel to thereby secure the retainer clip.

One advantage of the present invention is that it provides a retainer clip assembly which can be transported as part of a larger module.

Another advantage of the present invention is that the transportation clip provided for transporting the retainer clip with the module need not be removed prior to final installation of the retainer clip. Advantageously, this reduces material waste and accelerates the assembly process.

Yet another advantage of the present invention is that the locking mechanism and associated release member provides a convenient mechanism for installing the retainer clip yet allowing removal thereof at a later time. Conventionally, interior components of an automobile snap into place during initial installation, but are difficult to remove, and often break in the event that they are removed. The release member of the present invention avoids this problem.

Still another advantage of the present invention is that both the lever and the transportation clip are concealed within the confines of the housing of the retainer clip, so that the retainer clip is both functional and attractive.

BRIEF DESCRIPTION OF THE DRAWINGS

The above-mentioned and other advantages and objects of this invention, and the manner of attaining them, will become more apparent and the invention itself will be better understood by reference to the following description of embodiments incorporating the invention taken in conjunction with the accompanying drawings, wherein:

FIG. 1 is a fragmentary perspective view of an interior portion of an automobile which includes the vehicle headliner, sun visor assembly, and inventive retainer clip in accordance with the present invention:

FIG. 2 is a perspective view of a retainer clip in accordance with the present invention;

FIG. 3 is a second perspective view of the retainer clip shown in FIG. 2 taken from a different angle;

FIG. 4 is a side sectional view illustrating the relationship of the retainer clip of FIG. 2 with the panel and headliner of an automobile;

FIGS. 5–7 show a sequence of steps for the installation of the retainer clip shown in FIG. 3 into the interior of an automobile;

FIG. 7A is an enlarged fragmentary cross-sectional view of the portion indicated in FIG. 7;

FIG. 8 is a side sectional view illustrating the disengagement of the release member of an embodiment of the present invention;

FIG. 9 illustrates an alternate embodiment of a retainer clip in accordance with the present invention;

FIG. 10 illustrates another embodiment of a retainer clip in accordance with the present invention;

FIG. 11 illustrates yet another embodiment of a retainer clip in accordance with the present invention;

FIG. 12 illustrates yet another embodiment of a retainer clip in accordance with the present invention;

FIGS. 13–15 illustrate a sequence of steps for the installation of the retainer clip of FIG. 9 into an automobile interior;

FIGS. 16–18 shown a sequence of steps for the installation of the retainer clip of FIG. 10 into an automobile interior;

FIGS. 19–21 show a sequence of steps for the installation of the retainer clip of FIG. 11 into an automobile interior;

FIG. 25 is a perspective view exploded away illustrating the relationship of a transportation clip in accordance with the present invention, and a vehicle headliner;

FIG. 26 is a perspective view illustrating the installation of the transportation clip of FIG. 25 into an opening provided through a headliner;

FIG. 27 is a perspective view exploded away illustration the relationship of the transportation clip of FIG. 25 and a retainer clip;

FIG. 28 is a perspective view illustrating the transportation clip of FIG. 25 fully installed into the retainer clip of FIG. 27;

FIG. 29 is a cross sectional view illustrating the retainer clip and transportation clip in accordance with an embodiment of the present invention in a pre-installation position.

FIG. 30 is a cross sectional view of the retainer clip and a transportation clip in accordance with an embodiment of the present invention shown in an installed position;

FIG. 31 is a side elevational view in partial cross section illustrating another embodiment of a lever in accordance with an embodiment of the present invention; and FIG. 32 is a side elevational view in partial cross section illustrating installation of the lever shown in FIG. 31 into a vehicle interior.

FIG. 40 is a perspective view illustrating the transportation clip of FIGS. 38 and 39 fully installed and also illustrating, exploded away, the relationship of the retainer clip to the transportation clip;

FIG. 41 is a perspective view illustrating the transportation clip and the retainer clip in the installed position;

Figure 21:
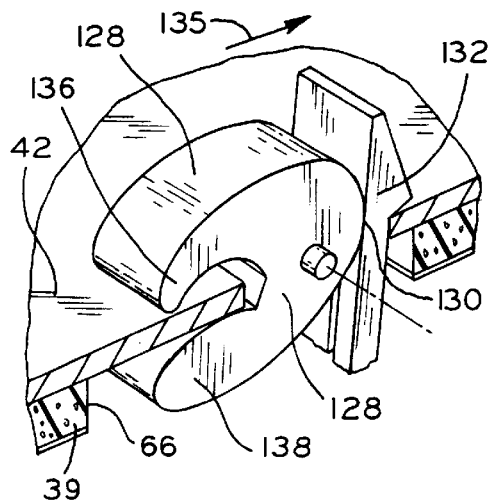

Corresponding reference characters indicate corresponding parts throughout the several views. Although the drawings represent embodiments of the invention, the drawings are not necessarily to scale and certain features may be exaggerated in order to better illustrate and explain embodiments incorporating the present invention.

DETAILED DESCRIPTION OF EXEMPLARY EMBODIMENTS

Referring now to FIG. 1, there is shown a vehicle interior including sun visor assembly 30, which further includes sun shade 32, vanity mirror 34, connecting bracket 36, sun visor rod 38 which is releasably received by retainer clip 40. Retainer clip 40 is secured to headliner 39 and a rigid interior panel 42 (FIG. 4).

With reference to FIGS. 2–7, a retainer clip in accordance with an exemplary embodiment of the present invention can be understood. Retainer clip 40 includes a housing member 44 which forms a retainer clip body. The housing member defines an edge 46 adapted to abut the exposed side of headliner 39. Housing member 44 further defines a notch 48 for releasably receiving rod 38 of sun visor assembly 30. As seen in FIG. 2, housing member 44 includes a pair of fingers 50 integrally formed with housing member 44. Housing member 44 is formed of a polymer material, such as polyethylene, polypropylene or other suitable polymer. Fingers 50 are depressed inwardly as rod 38 is received into notch 48 and serve to maintain sun visor 30 in the position shown in FIG. 1. Sun visor 30 can pivot about a longitudinal axis of rod 38 as is conventional for sun visors for providing shade. Fingers 50 include a rounded portion 52 at a distal end thereof so that rod 38 "snaps" into place and so that a tactile indication is provided to the vehicle user that the rod 38 is snapped into place within notch 48.

Lever 54 is movably attached to housing member 44 by means of a pair of cylindrical pegs 56 (FIG. 28) extending from lever 54 which insert into a corresponding pair of cylindrical bores 58 (FIG. 28) disposed in a corresponding pair of bores 58, which in turn are formed in a corresponding pair of beams 60 depending upwardly from the interior of housing member 44.

Lever 54 is movable to a first position wherein the lever is adapted for insertion into opening 62 which extends through panel 42 and headliner 39 as seen in FIG. 4. Opening 62 is a two-tiered opening comprising a smaller panel section 64 and a larger headliner section 66. Beam 60 includes a cylindrical nub 68 extending from a distal portion thereof which serves to guide retainer clip 40 through opening 62. As shown in FIG. 5, lever 54 includes a pair of projections 70 and 72 at its distal end, and the projections define a slot 74 therebetween for receiving a portion of panel 42.

FIG. 7 illustrates a second position of lever 54 in which projection 70 of lever 54 abuts panel 42 which helps secure retainer clip 40 to the headliner and panel. Movement of lever 54 from its first to its second position can be appreciated with reference to the sequence of movement depicted in FIGS. 4–7. As most clearly in FIG. 7, lever 54 and edge 46 of clip 40 effectively sandwich panel 42 and headliner 39 therebetween in the second position of lever 54. With reference to FIGS. 7 and 8, and in particular FIG. 7A, locking mechanism 76 including release member 78 is illustrated. Lever 54 includes ratchet member 80 disposed thereon in the shape of a saw-toothed edge. Housing member 44 defines pawl member 82 which also is formed as a saw-toothed edge. Ratchet member 80 engages pawl member 82 thereby locking lever 54 in the second position, which in turn secures retainer clip 40 to the interior of the vehicle. It should now be appreciated that retainer clip 40 can easily be inserted and secured into the vehicle by simply inserting the guide nub 68 into opening 62 and pushing the clip into place by hand. In so doing, the clip automatically locks into place as the lever automatically moves to its second position.

As shown in FIG. 2, notch 48 of housing 44 forms an access hole 84 therethrough for accessing release member 78. As shown in FIG. 8, implement 86, such as a screw driver or scratch awl, can be positioned to engage release member 78 through access hole 84 for disengaging lever 54 from the second position, and in turn enabling retainer clip 40 to be removed.

With reference to FIG. 9 and FIGS. 13–15, a second embodiment of a retainer clip in accordance with the present invention is illustrated. Retainer clip 88 includes bracket 90 having arm member 92 extending therefrom. Similar to the first embodiment described above, lever 94 is movably attached to bracket 90 by means of a pair of cylindrical pegs extending into bores 96. With reference to FIG. 13, lever 94 includes a pair of projections 98 and 100 which define a V-shaped slot 102 therebetween. With reference to FIG. 15, projection 98 abuts against panel 42 whereas arm member 92 of bracket 90 abuts against panel 42 on the opposite side of the opening 62. A locking mechanism (not shown for the embodiment depicted in FIG. 9 and FIGS. 13–15) such as that provided for the above-described first embodiment is provided to maintain lever 94 in its second position, thereby securing the retainer clip to the vehicle interior.

FIG. 10 and FIGS. 16–18 illustrate a third embodiment incorporating the present invention. Retainer clip 104 includes a pair of levers 106 and 108 pivotable about pin 110 disposed within corresponding bores through levers 106 and 108. Each lever 106, 108 includes a pair of projections 112, 114 and 116, 118, each of which defines a square slot 120, 122, respectively, therebetween. As shown in FIG. 10, the locking mechanism which secures levers 106 and 108 into their second position is formed of a pair of latch members 124 (only one of which is shown in FIG. 10) which engage panel 42 as clip 104 is pressed upwardly into opening 62. The installation of retainer clip 104 can be appreciated with reference to the sequence depicted by FIGS. 16–18.

FIG. 11 and FIGS. 19–21 illustrate a fourth embodiment of the retainer clip incorporating the present invention. Retainer clip 126 includes lever 128 having cam surface 130 which cammingly engages latch member 132 which extends from housing member 134. As shown in FIGS. 20–21, the retainer clip is pushed upwardly which results in camming surface 130 engaging latch member 132 and pushing latch member 132 in the direction of arrow 135 which thereby secures retainer clip 126. Lever 128 includes projections 136, 138 projection 136 abutting against panel 42 when lever 128 is in its second position.

Figure 22:
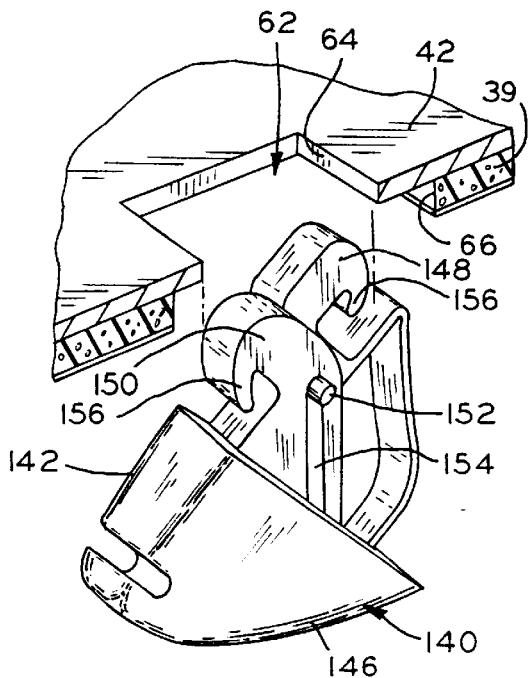
FIGS. 22–24 illustrate a sequence of steps for the installation of the retainer clip of FIG. 12 into an automobile interior.
Figure 23:
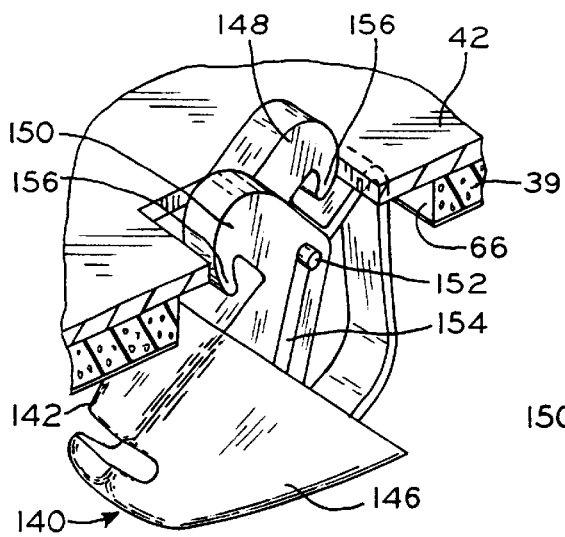
Figure 24:
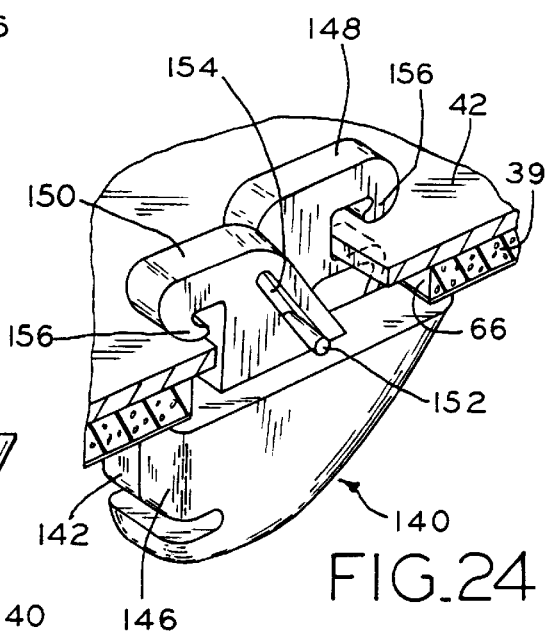
Figure 24A:
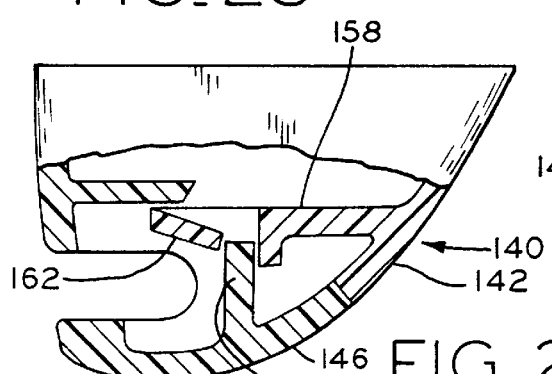
FIG. 24A is a fragmentary cross-sectional view of the retainer clip of FIG. 12 which illustrates the locking mechanism.
Figure 33:
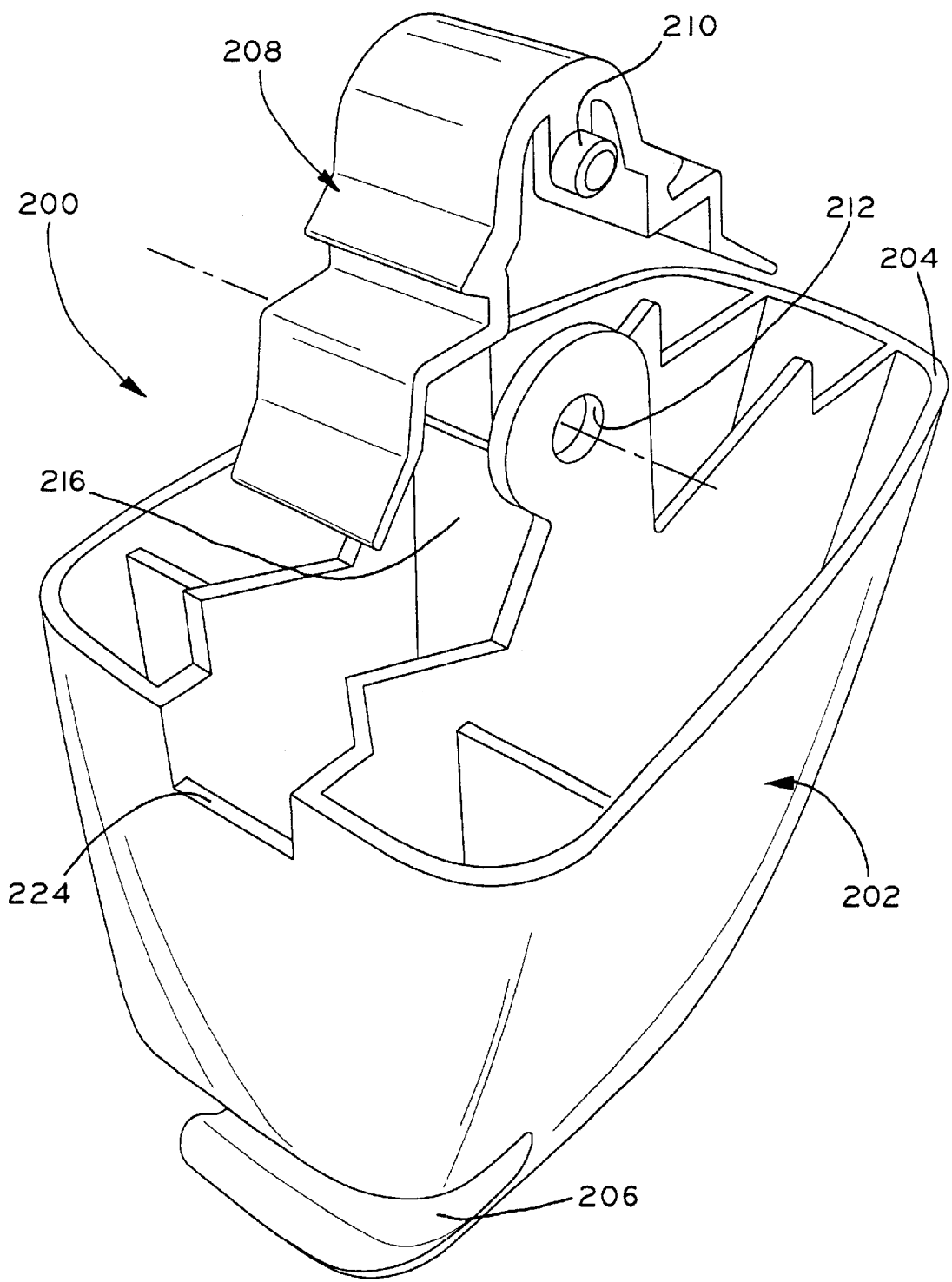
FIG. 33 is a perspective view of an alternate embodiment of a retainer clip in accordance with the present invention.
Figure 34:
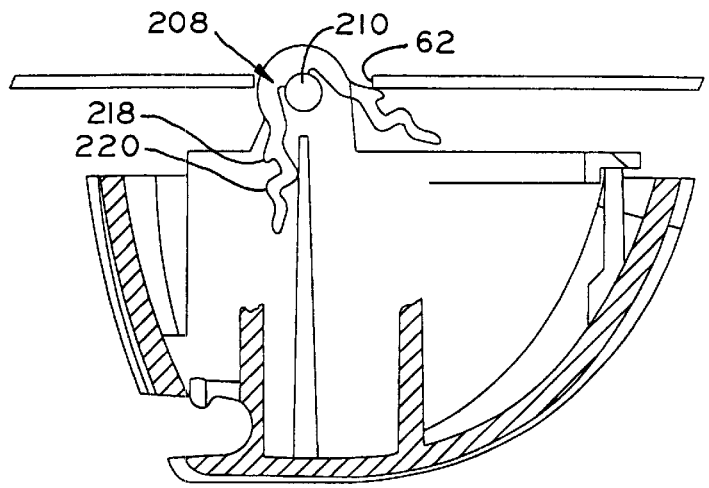
FIGS. 34–36 show a sequence of steps for the installation of the retainer clip shown in FIG. 33 into the interior of an automobile.
Figure 35:
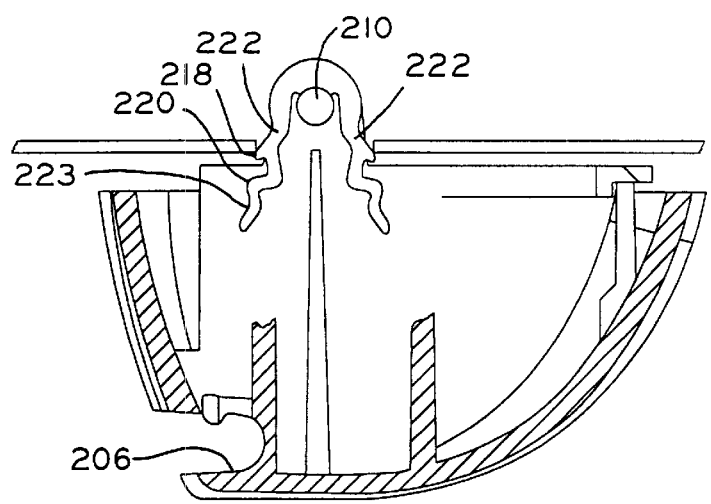
Figure 36:
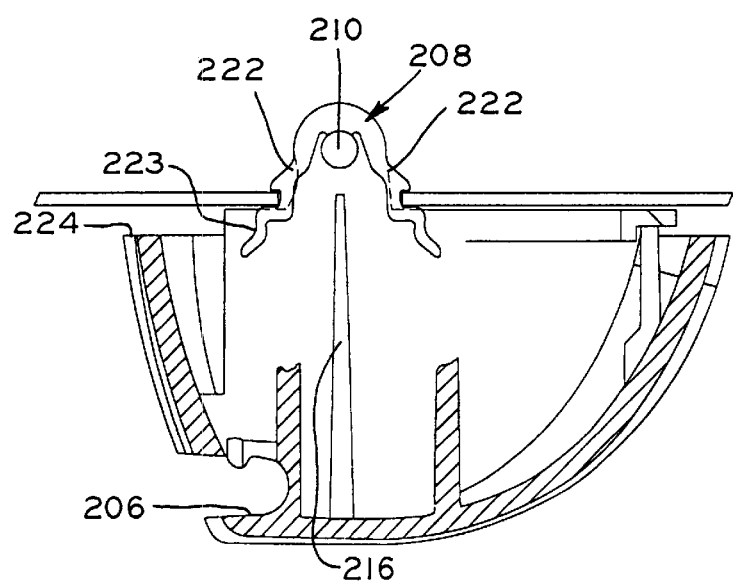
Figure 37:
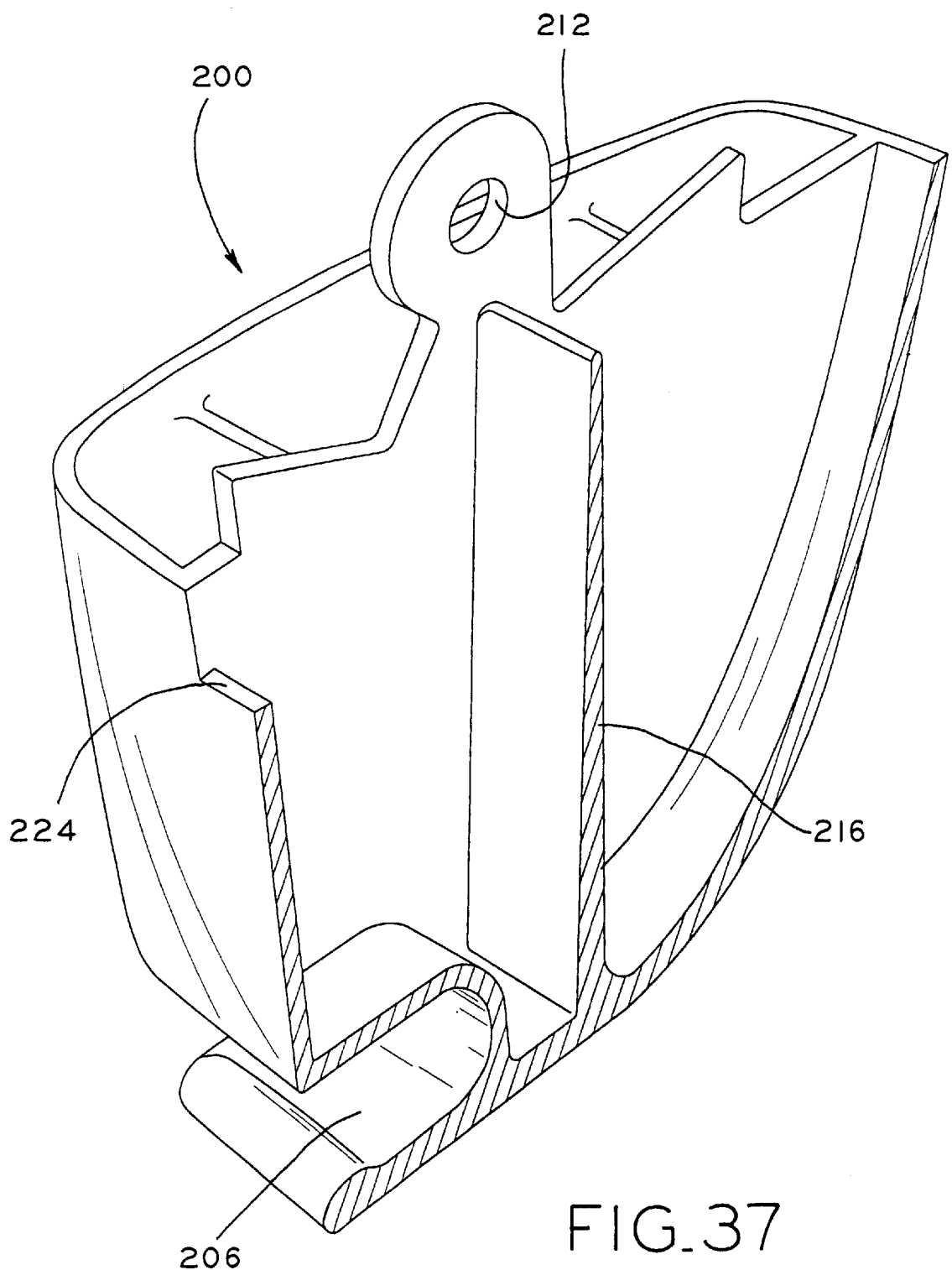
FIG. 37 is a perspective view in partial cross section which illustrates the beam member of the retainer clip of FIG. 33.
Figure 38:
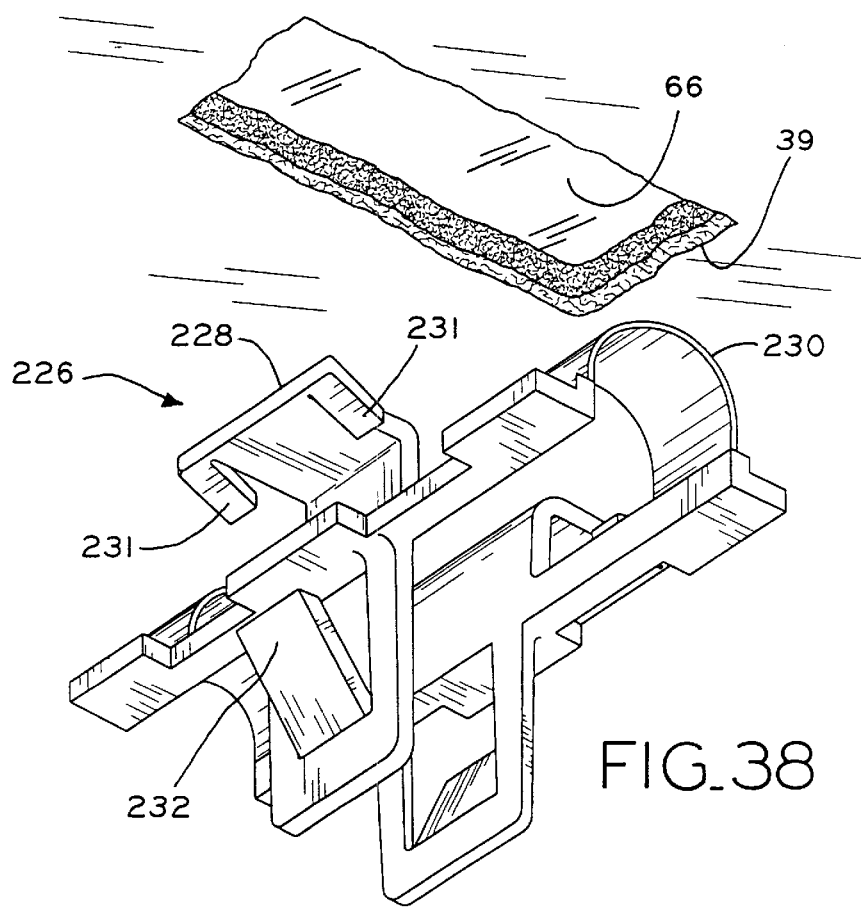
FIG. 38 is a perspective view exploded away illustration the relationship of a transportation clip in accordance with an embodiment of the present invention and a vehicle headliner.
Figure 39:
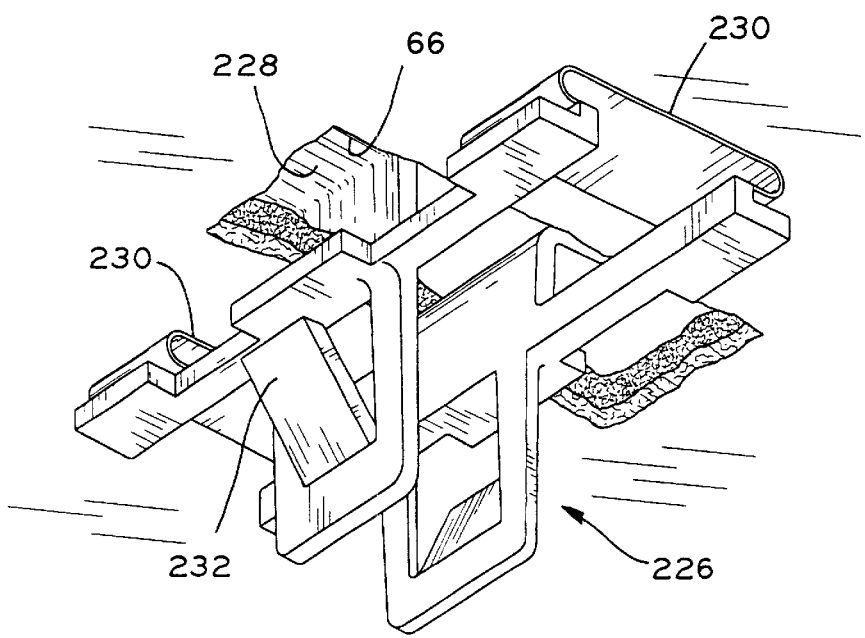
FIG. 39 is a perspective view illustrating the installation of the transportation clip of FIG. 38 into an opening provided through a headliner.
Figure 42:
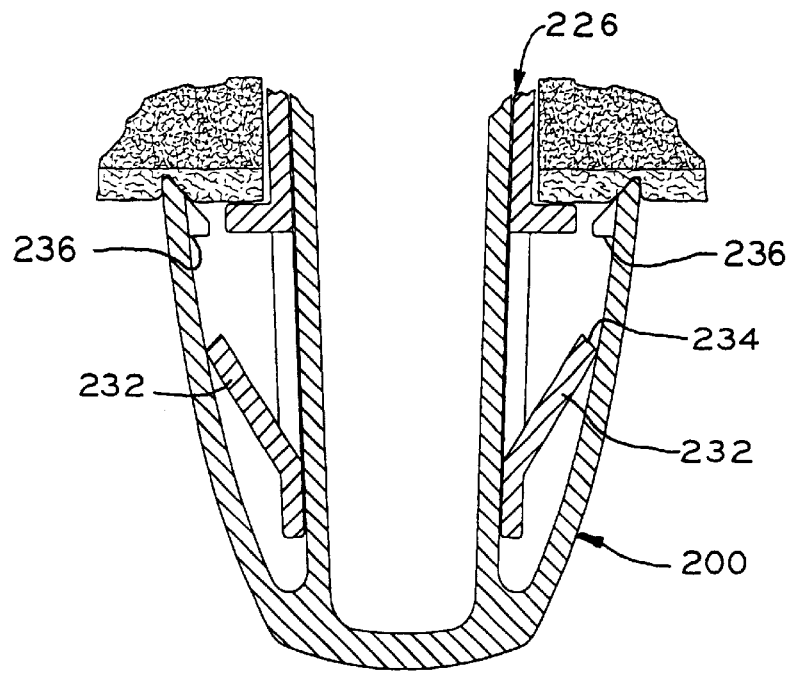
FIG. 42 is a cross sectional view illustrating the retainer clip and the transportation clip in accordance with an embodiment of the present invention in an installed position.
Figure 43:
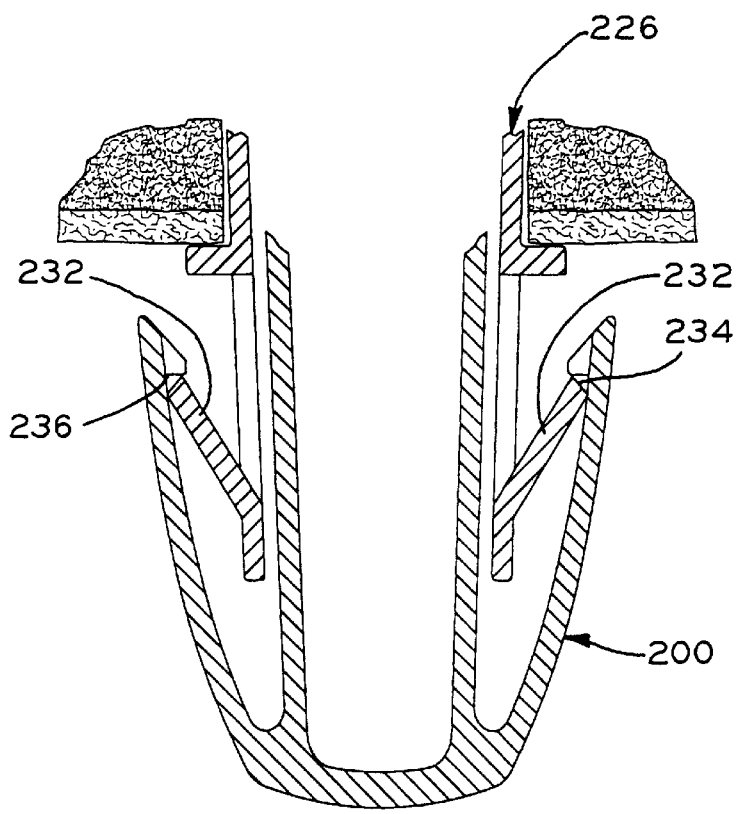
FIG. 43 is a cross sectional view of the retainer clip and a transportation clip in accordance with an embodiment of the present invention in a pre-installed position.
Figure 46:
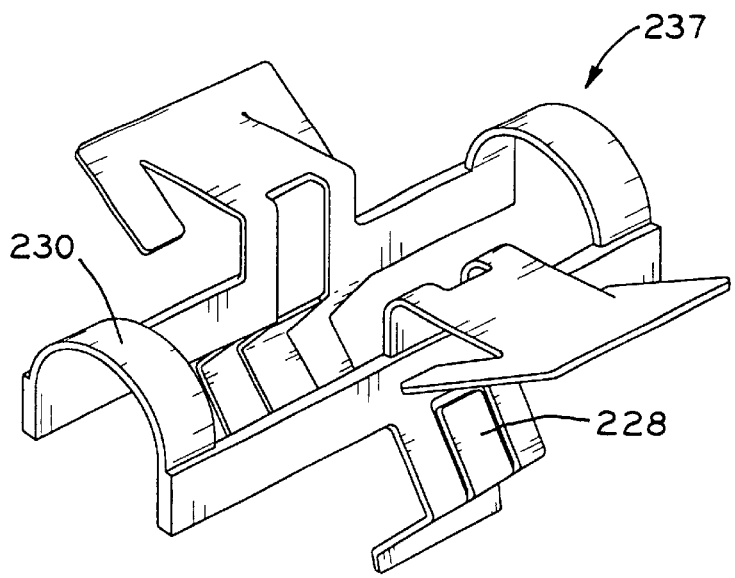
FIG. 46 is a perspective view of the transportation clip of FIG. 44.
Figure 45:
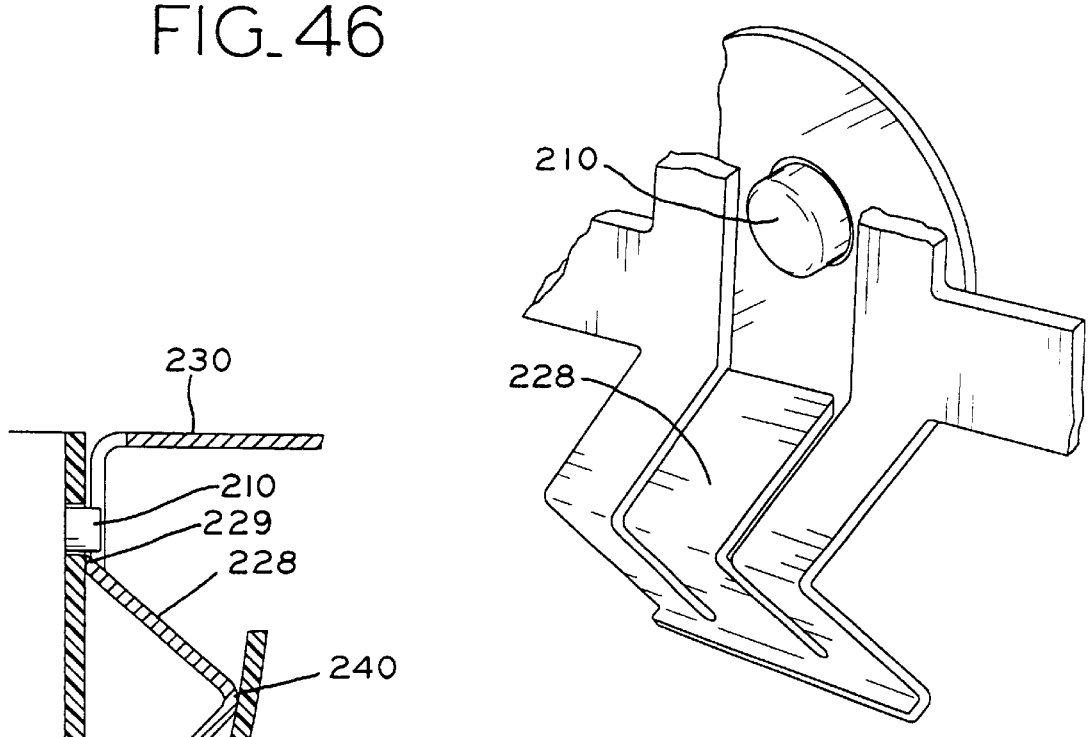
FIG. 45 is a fragmentary perspective view illustrating the relationship between the trunnion of the beam member of the retainer clip and the transportation clip
Figure 44:
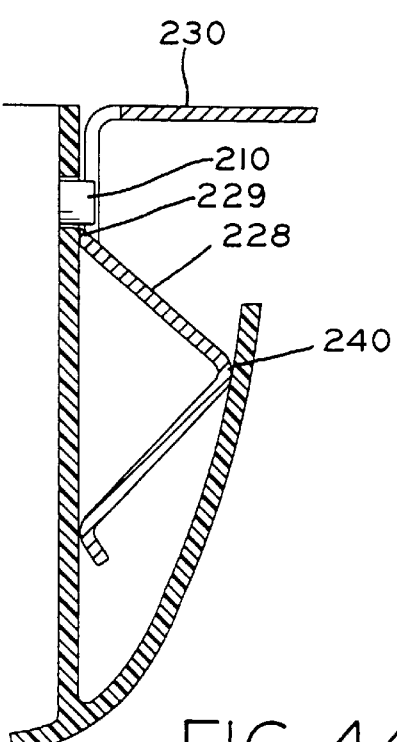
FIG. 44 is a fragmentary sectional view showing an alternate engagement mechanism between the transportation clip and the retainer clip in accordance with an embodiment of the present invention.
Figure 47:
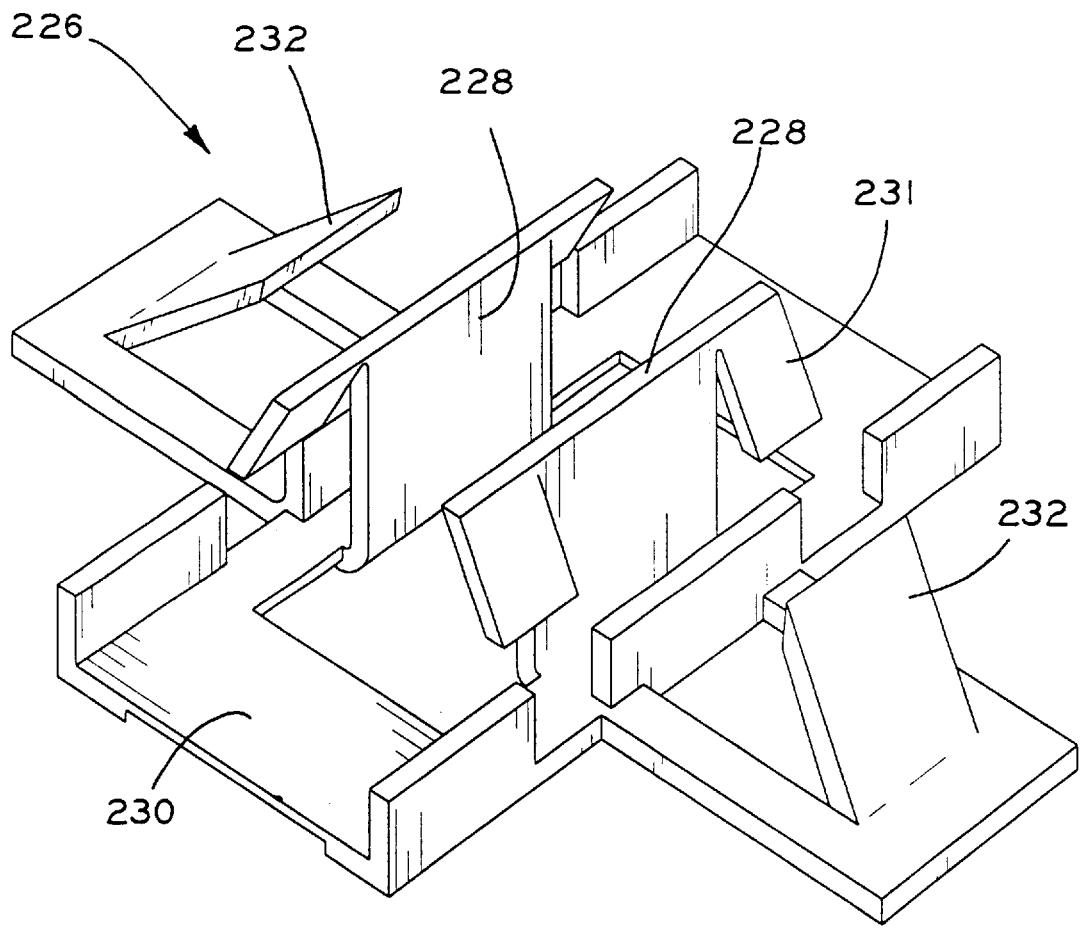
FIG. 47 is a perspective view of the transportation clip FIG. 38 before the transportation clip is formed or bent into shape.

FIG. 12 and FIGS. 22–24 illustrate a fifth embodiment of a retainer clip embodying the present invention. With reference to FIG. 12, retainer clip 140 is formed of two housing members 142 and 146. Levers 148 and 150 are integrally formed with housing members 142 and 146, respectively. A pivot pin 152 is slidably disposed in corresponding slots 154 (only one of which is shown) formed in levers 148 and 150. As illustrated in FIGS. 22–24, as retainer clip 140 is inserted into opening 62 defined by panel 42 and headliner 39, housing members 142 and 146 pivot relative to one another while pivot pin 152 slides downwardly in corresponding slots 154. Projections 156 disposed on each of levers 148 and 150 abut against panel 42 in the second position of levers 148 and 150 as shown in FIG. 24. A locking mechanism for clip 140 is shown in FIG. 24A. Housing member 142 includes internally disposed latch member 158 which engages internally disposed catch member 160 which is integrally formed with housing member 146. Release member 162 can be accessed through an access opening disposed in the notch as described above with reference to the first described embodiment.

FIGS. 31 and 32 illustrate a sixth embodiment incorporating the present invention wherein lever 164 includes latch member 166 formed as a saw-toothed surface which engages panel 42. As shown in FIG. 32, lever 164 includes ratchet member 168 which engages pawl member 170 defined by the interior of the retainer clip housing. Release member 172 is accessible through an access opening in the notch which receives the sun visor rod in order to release the retainer clip.

With reference to FIG. 25, transportation clip 174 is used in a transportable automobile module which includes headliner 39, transportation clip 174 and retainer clip 40. Headliner 39 will be placed adjacent rigid panel 42 during final assembly of the vehicle. Transportation clip 174 can be "pre-installed" into opening 66 in headliner 39 by positioning flange members 176 of transportation clip 174 in alignment with headliner opening section 66 as shown in FIG. 25. As shown in FIG. 26, transportation clip 174 is then rotated within headliner opening section 66 to the position shown in FIG. 27 where it is hooked to the headliner in a "pre-installation" position. Transportation clip 174 engages retainer clip 40 in the pre-installation position so that the module can be transported with the retainer clip connected to the headliner.

The engagement of retainer clip 40 with transportation clip 174 in both the pre-installation and installed positions can be appreciated with reference to FIGS. 29 and 30. As shown in FIG. 29, transportation clip 174 includes web members, or catch members 178, having ends 180 thereof which extend into recesses 182 formed on opposite sides of retainer clip 40. In this position, retainer clip 40 is connected to transportation clip 174 and transportation clip 174 is hooked to headliner 39 by means of flange members 176 as shown in FIG. 29.

With reference to FIG. 30, when retainer clip 40 is pushed upwardly into the opening defined by the headliner and panel, transportation clip 174 is forced downwardly into retainer clip 40. That is, ends 180 disengage from recesses 182 and slide along beam 60 of housing 44. Meanwhile, lever 54 engages panel 42 as described hereinabove with reference to the first embodiment. With further reference to FIG. 30, the installed position includes the flange members 176 being sandwiched between headliner 39 and panel 42. Conveniently, transportation clip 174 is concealed within retainer clip 40 in the installed position so that transportation clip 174 need not be removed.

It will be appreciated that the foregoing embodiments are presented by way of illustration only, and not by way of any limitation, and that various alternatives and modifications may be made to the illustrated embodiments without departing from the spirit and scope of the invention. For example, the above-disclosed embodiments describe a retainer clip for releasably receiving a rod of a sun visor. However, it can be appreciated that the invention could easily be adapted to other interior vehicle components, such as the hooks conventionally installed above the rear doors for hanging coats and the like.

What is claimed is:

1. An automobile interior assembly, comprising:
   a headliner defining an opening therethrough;
   a retainer clip having a notch for releasably receiving a rod of a vehicle sun visor; and
   a transportation clip disposed in said opening, said transportation clip having a flange and a catch member;
   said retainer clip positionable by said transportation clip in a preinstalled position, wherein said flange hooks said transportation clip to said headliner and said catch member releasably retains said retainer clip.

2. The assembly of claim 1, further comprising a rigid panel positioned adjacent said headliner, said retainer clip further positionable in an installed position, wherein in said installed position, said catch member is disengaged from said retainer clip and said transportation clip is maintained with and concealed by said retainer clip.

3. The assembly of claim 2, wherein said flange member is sandwiched between said headliner and the rigid panel in said installed position.

4. The assembly of claim 2, wherein said flange member comprises a pair of flange members.

5. The assembly module of claim 2, wherein said retainer clip comprises a recess for receiving said catch member in said pre-installed position, said catch member being disengaged from said recess in said installed position.

6. The module of claim 2, wherein said retainer clip further comprises a lever movably attached thereto, said lever securing said retainer clip and said transportation clip to said headliner and said rigid panel in said installed positions.

7. The assembly of claim 2, further comprising a release member accessible exteriorly of said retainer clip, whereby said retainer clip can be removed from said assembly.

* * * * *

UNITED STATES PATENT AND TRADEMARK OFFICE
CERTIFICATE OF CORRECTION

PATENT NO.   : 6,336,672 B2
DATED        : January 8, 2002
INVENTOR(S)  : Jeffrey L. Beaver It is certified that error appears in the above-identified patent and that said Letters Patent is hereby corrected as shown below:

<u>Title page,</u>
Add the following information -- [73] Assignee: Crotty Corporation, 854 East Chicago Road, Quincy, Michigan 49082 --

Signed and Sealed this

Eighth Day of October, 2002

Attest:

Attesting Officer

JAMES E. ROGAN
*Director of the United States Patent and Trademark Office*